United States Patent [19]

Yoshimura

[11] Patent Number: 4,826,296
[45] Date of Patent: May 2, 1989

[54] ELECTRONIC APPARATUS WITH LIQUID CRYSTAL DISPLAY DEVICE HAVING A PLATE TO PROVIDE A TRANSPARENT OR A REFLECTIVE MODE

[75] Inventor: Yutaka Yoshimura, Nara, Japan
[73] Assignee: Sharp Kabushiki Kaisha, Osaka, Japan
[21] Appl. No.: 89,506
[22] Filed: Aug. 26, 1987
[30] Foreign Application Priority Data Aug. 26, 1986 [JP] Japan .................. 61-130438[U]

[51] Int. Cl.⁴ .............................................. G02F 1/13
[52] U.S. Cl. .............................. 350/338; 350/331 R; 350/345; 350/334
[58] Field of Search .................. 350/331 R, 345, 338, 350/334

[56] References Cited

U.S. PATENT DOCUMENTS

| | | | |
|---|---|---|---|
| 3,887,791 | 6/1975 | Kitchens | 350/331 R |
| 4,385,806 | 5/1983 | Fergason | 350/347 R |
| 4,451,121 | 5/1984 | Fushimoto | 350/338 |
| 4,562,478 | 12/1985 | Hirasawa et al. | 350/338 |
| 4,643,530 | 2/1987 | Yamazaki | 350/338 |
| 4,675,787 | 6/1987 | Suwa | 350/338 |

FOREIGN PATENT DOCUMENTS

| | | | |
|---|---|---|---|
| 3527884 | 2/1986 | Fed. Rep. of Germany | 350/338 |
| 0095516 | 5/1985 | Japan | 350/338 |

Primary Examiner—Stanley D. Miller
Assistant Examiner—Huy K. Mai
Attorney, Agent, or Firm—Birch, Stewart, Kolasch & Birch

[57] ABSTRACT

An electronic apparatus comprising a liquid crystal display device, a cabinet of the electronic apparatus supporting the liquid crystal display device and a plate mounted on the cabinet to selectively change the liquid crystal display device between a transmissive type and a reflective type. This plate is either slidable or pivotable from a position under the liquid crystal display device to a position in which the view through the liquid crystal display device is unobstructed.

7 Claims, 2 Drawing Sheets

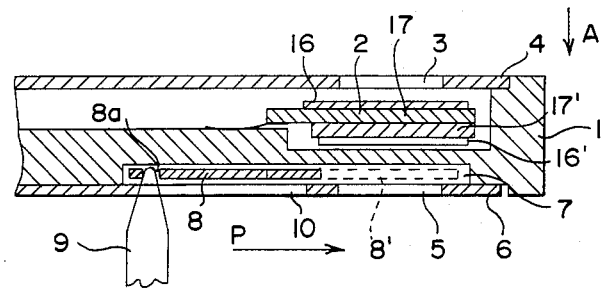
FIG. 1
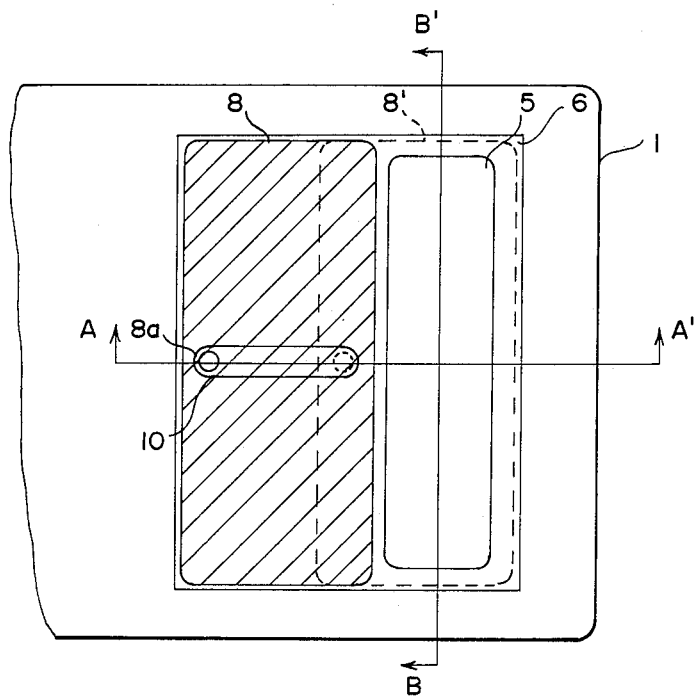
FIG. 2
FIG. 3
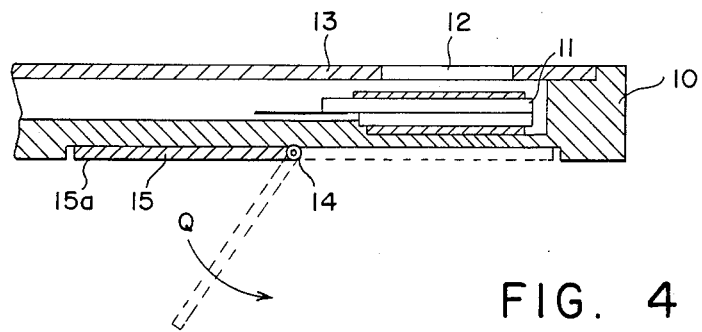
FIG. 4

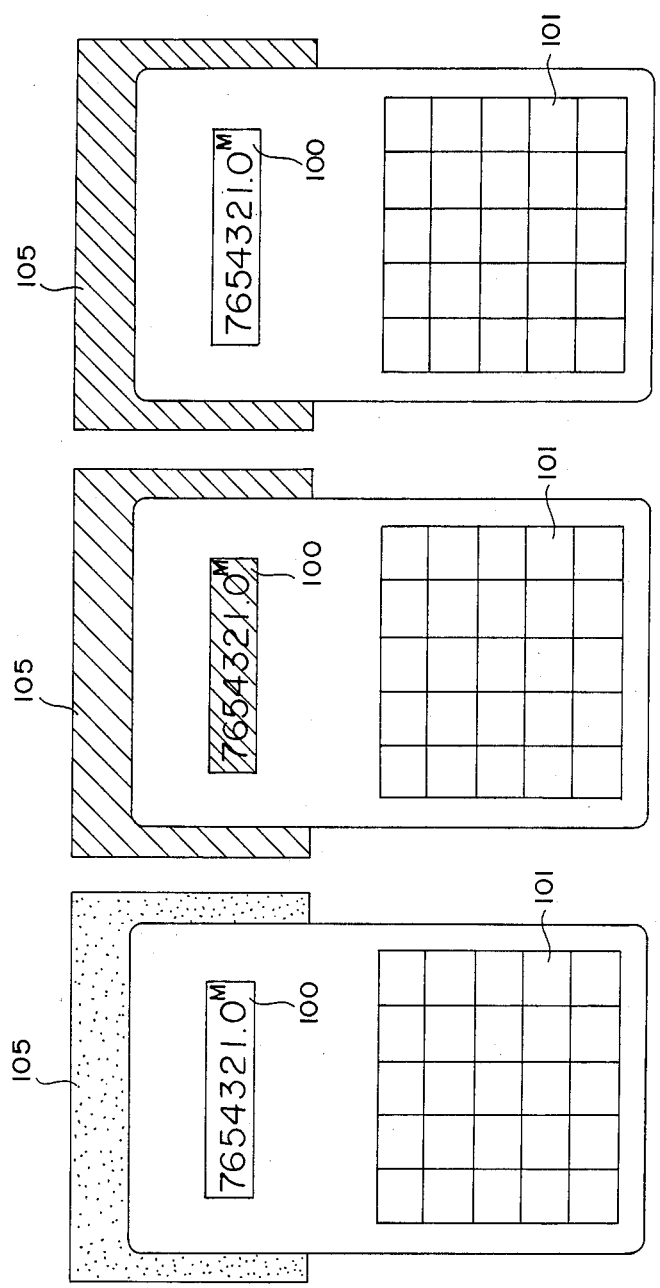

ELECTRONIC APPARATUS WITH LIQUID CRYSTAL DISPLAY DEVICE HAVING A PLATE TO PROVIDE A TRANSPARENT OR A REFLECTIVE MODE

BACKGROUND OF THE INVENTION

This invention relates to an electronic apparatus with liquid crystal display device.

Liquid crystal display devices have been widely used as a means to display information of an electronic apparatus. Liquid crystal display devices are classified into reflective types and transmissive types.

Recently, an electronic apparatus equipped with a transmissive type of liquid crystal display device is presented so that the reflecting side (opposite side) can be seen through the display part.

As shown in FIG. 5(a) when the background 105 for a liquid crystal display device 100 has a light color, that is, an electronic apparatus is put on a light-colored material, the contrast to the indicated numeral (display pattern) of the liquid crystal display device is clear, and the numeral is easy to read. But as shown in FIG. 5(b), when the background 105 has a dark color, that is, the electronic apparatus is put on a dark-colored material, the display of the liquid crystal display device becomes difficult to read.

Here the apparatus shown in the drawings is an electronic calculator, where numeral 101 denotes operation keys. (Key symbols are omitted.)

SUMMARY OF THE INVENTON

In order to solve the above problems, it is a primary object of this invention to provide an electronic apparatus in which the liquid crystal display device may be either a transmissive type or a reflective type.

It is another object of this invention, considering the above circumstances, to provide an electronic apparatus so designed that the display pattern can always easily be seen by mounting a reflection plate capable of being moved along the back of the liquid crystal display device when the electronic apparatus is put on a dark-colored material and when the background color of the transmissive type of liquid crystal display device becomes dark.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, the electronic apparatus comprises a liquid crystal device, a cabinet of the electronic apparatus to support said liquid crystal display device, and a means being mounted on said cabinet to change said liquid crystal display apparatus between a transmissive type and a reflective type.

This invention, relating to an electronic apparatus having a transmissive type liquid crystal display device and capable of seeing through the face and back side of the apparatus and through the liquid crystal display device, by mounting a reflection plate for the liquid crystal display device and by making it possible to move the reflection plate along the back of the liquid crystal display device to another position, making it possible to select, according to the position of said reflection plate, either the state in which the peripheral part of the display pattern of the liquid crystal display device is transparent or the state in which a preferable contrast of background color can be obtained by the reflection plate.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is a sectional, side view of an electronic apparatus taken along line A—A' of FIG. 2 relating to an embodiment of the present invention;

FIG. 2 is a back side view of said electronic apparatus;

FIG. 3 is a sectional view of said electronic apparatus taken along line B—B' of FIG. 2;

FIG. 4 is a sectional side view of an electronic apparatus relating to another embodiment of the present invention; and FIGS. 5(a), (b), (c) are views of the changes of the display status due to the background color of a transmissive liquid crystal display device.

DETAILED DESCRIPTION OF THE INVENTION

An electronic apparatus having a transmissive type liquid crystal display device of an embodiment of this invention is explained herein. Here, as an electronic apparatus, an electronic calculator is taken as an example for the purposes of explanation.

FIG. 1 is a sectional view of an electronic apparatus relating to an embodiment of this invention. More particularly, FIG. 1 is a display part of an electronic calculator.

A transmissive type of liquid crystal display device 2 is mounted on a cabinet 1 made of transparent resin. This transmissive type of liquid crystal display device is constructed by placing a liquid crystal layer between two transparent substrates 17, 17' and by setting polarizers 16, 16' respectively on the outer sides of both substrates.

An upper panel 4 equipped with a window (or a transparent opening) 3 is mounted on the front side of the cabinet 1 and a rear panel 6 equipped with a window (or a transparent opening) 5 is mounted on the back side of the cabinet 1. Accordingly, when an operator looks at the main body of the apparatus in the direction of arrow A, a display part of said liquid crystal display device 2 can be seen. Simultaneously with viewing the display on the liquid crystal display 2, the area on the opposite side of the cabinet 1 can be seen through the window 3, the liquid crystal display device 2 and the window 5. For example, when the electronic calculator of this embodiment is put on a sheet of white paper, the display of the liquid crystal display device 2 can be read against a white background.

In this embodiment, a space 7 is formed between the cabinet 1 and the rear panel 6, and a reflection plate 8 is inserted in the space 7. The reflection plate 8 is capable of sliding in the space 7. The plate 8 can move, as shown in FIG. 2, from the position shown in solid lines (not obstructing the view of through window 5) to the position (8') shown in dotted line. The sliding direction is indicated by arrow P in FIG. 1.

The reflection plate 8 is moved by putting the tip of a ball-point pen 9 or the like in a hole 8a made on the end part of the reflection plate 8. For that purpose, a slit 10 corresponding to the sliding length of the reflection panel 8 is formed on the back panel 6. Here, the reflection plate 8 is made of a material with a background color contrasting with the display pattern of said liquid crystal display device 2 such that the display can be easily read.

When the background color of the liquid crystal display device 2 is dark or provides poor contrast for viewing the display, an operator moves the reflection panel 8 in the direction of arrow P. Thus, the reflection panel 8 is positioned between the liquid crystal display device 2 and the rear panel 6 (the position shown by dotted lines in FIG. 1). At this time, the liquid crystal display device 2 becomes a reflective type.

The moved reflection panel 8 reflects the light entering from the display side of the liquid crystal display device 3. In other words, the light entering through the window 3 of the upper panel 4 is reflected back through windows 3 from panel 8. The panel 8 provides for a background color for the liquid crystal display device 2 whereby the display pattern can be easily read in a preferable contrast.

This system is shown in FIG. 5(c). When the electronic apparatus is put on a dark-colored paper 105, a preferable contrast can be obtained owing to the action of the reflection plate 8, and thus, the display pattern of the liquid crystal display device can be clearly read.

The back side of an electronic calculator of this embodiment is shown in FIG. 2 and a front sectional view of the electronic calculator is shown in FIG. 3.

FIG. 1 corresponds to a sectional view obtained by cutting along the line A—A' in FIG. 2. And the FIG. 3 corresponds to a sectional view cut along the line B—B' in FIG. 2. As seen in FIG. 3, the walls 18, 18' on both sides of the space 7 in which the reflection plate 8 is placed act as guides for controlling sliding of the plate 8.

Here, though omitted in the drawings, a circuit substrate in which an LSI chip is built is mounted on the cabinet 1 and the circuit substrate and the liquid crystal device 2 are electrically connected. Additionally, as shown in FIG. 5, a keyboard from which data is entered is provided, and the information corresponding to the input is processed in the LSI chip and displayed on the display device 2.

Another embodiment of this invention will now be explained with reference to FIG. 4.

In this embodiment, a pivotable reflection plate 15 is provided. By pivoting the reflection plate, the liquid crystal display device can be either a transmissive type or a reflective type.

As shown in FIG. 4, a transmissive type liquid crystal device 11 is mounted on a transparent cabinet 10 and an upper panel 13 having a transparent window 12 is placed on the front side of the cabinet 1.

A reflection plate 15 supported on a pivot shaft 14 is positioned on the back side of the cabinet 1. The reflection plate 15 is coated with a coloring material on side 15a which provides a preferable contrastive background against the liquid crystal display device 11.

When the reflection plate 15 is fixed at the position shown by the solid line, the background color of the liquid crystal display device 11 is light or corresponds to the background under carbinet 10 when the background color becomes dark and the display pattern of the liquid crystal display device 11 becomes difficult to read, the reflection plate 15 is pivoted by 180° in the direction shown by an arrow Q and is moved to the position shown by a broken line. The reflection plate 15 is that in the rear position of the liquid crystal display device 11.

According to this invention as explained herein, in an electronic apparatus with a transmissive type liquid crystal display device (an apparatus in which it is capable of seeing the face and back side of the apparatus through the liquid crystal display device), a reflection plate of the liquid crystal display device is mounted and provided in such a way as to move from the back position of the liquid crystal display device to another position. Movement of the reflection plate to the back position of the liquid crystal display device changes it into a reflective type liquid crystal display device. This movement may be carried out when the display pattern is hard to read because the background color is dark. The apparatus is, therefore, very convenient to use.

According to this invention, a user can freely select whether a transmissive type or a reflective type of display is to be used because of the provision of the movable reflection plate.

While only certain embodiments of the present invention have been described, it will be apparent to those skilled in the art that various changes and modifications may be made therein without departing from the spirit and scope of the present invention as claimed. Such variations are not to be regarded as a departure from the spirit and scope of the invention, and all such modifications as would be obvious to one skilled in the art are intended to be included within the scope of the following claims.

What is claimed is:

1. An electronic apparatus having a front side and a back side, said apparatus comprising:
   a liquid crystal display device mounted between the front and back sides of said apparatus, said liquid crystal display device being visible from areas of said apparatus adjacent both the front and back sides thereof;
   a movable plate located adjacent the back side of said apparatus, said plate being movable between a first position unobstructing said liquid crystal display device and a second position behind said liquid crystal display device; and
   means for enabling movement of said plate between said first and second positions, said liquid crystal display device being transmissive when said plate is in the first position such that said area of said apparatus adjacent the front side, said liquid crystal display device and said area of said apparatus adjacent the back side are capable of being seen through, and said liquid crystal display device being reflective when said plate is in the second position such that the view through said liquid crystal display device and the area of said apparatus adjacent the back side is blocked.

2. The electronic apparatus as recited in claim 1, further comprising a cabinet supporting said liquid crystal display device, said areas adjacent the front and back sides of the apparatus being windows in said cabinet.

3. The electronic apparatus as recited in claim 1, wherein said means for enabling movement comprises tracks mounted at the back side of said apparatus for permitting sliding of said movable plate between said first and second positions.

4. The electronic apparatus as recited in claim 3, wherein said apparatus has an elongated slit in the back side thereof, and said plate has an opening therein in alignment with said slit, said slit and opening permitting insertion of an element therethrough whereafter movement of said element slides said plate along said tracks.

5. The electronic apparatus as recited in claim 1, wherein said means for enabling movement comprises a pivot shaft at the back side of said apparatus for permitting pivoting of said movable plate between said first and second positions.

6. The electronic apparatus as recited in claim 1, wherein said liquid crystal display device comprises transparent substrates, a liquid crystal layer sandwiched between said substrates, and a polarizer plate mounted on the outside surface of each of said substrates.

7. The electronic apparatus as recited in claim 1, wherein said apparatus is used in a calculator.

* * * * *